US009101130B2

(12) United States Patent  
Orr (10) Patent No.: US 9,101,130 B2  
(45) Date of Patent: Aug. 11, 2015

(54) DEER TAIL DECOY

(71) Applicant: Stephen A. Orr, Port Deposit, MD (US)

(72) Inventor: Stephen A. Orr, Port Deposit, MD (US)

( * ) Notice: Subject to any disclaimer, the term of this patent is extended or adjusted under 35 U.S.C. 154(b) by 156 days.

(21) Appl. No.: 13/788,481

(22) Filed: Mar. 7, 2013

(65) Prior Publication Data

US 2014/0250760 A1    Sep. 11, 2014

(51) Int. Cl.  
*A01M 31/06* (2006.01)

(52) U.S. Cl.  
CPC ........................ *A01M 31/06* (2013.01)

(58) Field of Classification Search  
CPC .................................................. A01M 31/06  
USPC ............................................ 43/2, 3; D22/125  
See application file for complete search history.

(56) References Cited

U.S. PATENT DOCUMENTS

| 3,050,895 | A | * | 8/1962 | Bratland et al. | 43/3 |
|---|---|---|---|---|---|
| D268,695 | S | * | 4/1983 | Kolf | D22/125 |
| 5,029,408 | A | * | 7/1991 | Smith | 43/1 |
| D325,617 | S | * | 4/1992 | Smith | D22/125 |
| 5,191,730 | A | * | 3/1993 | Balmer | 43/2 |
| D339,402 | S | * | 9/1993 | Santos, Jr. | D22/125 |
| 5,335,438 | A | * | 8/1994 | Terrill | 43/2 |
| 5,546,692 | A | * | 8/1996 | Byers | 43/2 |
| 5,791,081 | A | * | 8/1998 | Turner et al. | 43/2 |
| 6,092,322 | A | * | 7/2000 | Samaras | 43/2 |
| 6,510,644 | B1 | * | 1/2003 | Gollnik | 43/2 |
| 6,640,483 | B2 | * | 11/2003 | Nelson | 43/2 |
| D489,117 | S | * | 4/2004 | Nelson | D22/125 |
| 6,782,653 | B1 | * | 8/2004 | Thomas | 43/2 |
| 6,901,693 | B1 | * | 6/2005 | Crowe | 43/2 |
| 7,231,737 | B2 | * | 6/2007 | Bradford | 43/2 |
| 7,441,365 | B2 | * | 10/2008 | Brunner et al. | 43/2 |
| 7,549,248 | B1 | * | 6/2009 | Luster | 43/2 |
| 7,562,487 | B2 | * | 7/2009 | Barr | 43/2 |
| D623,260 | S | * | 9/2010 | Gentle | D22/125 |
| D624,145 | S | * | 9/2010 | Gentle | D22/125 |
| 7,814,700 | B2 | * | 10/2010 | Groth | 43/2 |
| D634,809 | S | * | 3/2011 | Gentle | D22/125 |
| D645,536 | S | * | 9/2011 | Gentle | D22/125 |
| 8,402,685 | B1 | * | 3/2013 | Marshall | 43/2 |
| 8,769,860 | B2 | * | 7/2014 | Bain | 43/2 |
| 2003/0041500 | A1 | * | 3/2003 | Thomas | 43/2 |
| 2013/0305586 | A1 | * | 11/2013 | Forrester | 43/2 |

* cited by examiner

*Primary Examiner* — Darren W Ark (74) *Attorney, Agent, or Firm* — Panitch Schwarze Belisario & Nadel LLP (57) ABSTRACT

A deer tail decoy has a first triangular-shaped flap folded over a second flap. The inner faces of the first and second flaps comprise a material of a lighter color that contrasts with the outer faces of the first and second flaps. A tell-tale flap is integral with or joined to at least the inner face of the first flap. The decoy is removably mounted to an upright, such as a tree trunk. A pull cord is linked or removably joined at or near the pointed tip at the bottom of the first flap. Tugging motion on the pull cord causes the first flap to pivot upward to expose the inner faces of the first and second flaps and the tell-tale flap. In this open configuration, the deer tail decoy resembles the upward tail of a doe, and the tell-tale flap has loose edges that flutter and may be seen at angles offset from straight on view.

21 Claims, 7 Drawing Sheets

DEER TAIL DECOY

BACKGROUND

1. Field of the Invention

The present invention relates to a hunting decoy especially configured for attracting white tail deer to a hunter's location by visual stimulus.

2. Background

Hunters use various methods to attract white tail deer to the hunter's location. In a first instance, scents and sounds can be used to lure deer to a vicinity. Such methods often are deficient because the deer do not approach the hunter's location within shooting distance without additional visual confirmation of the presence of other animals.

White tail deer use their tails as a visual means of communication with other deer. For example, does will raise their tails to signal that they are ready to breed. Bucks recognize and are attracted to a doe's tail raising display. Accordingly, Visual attractors (decoys) have been proposed for hunting white tail deer.

U.S. Pat. No. 5,791,081 is a deer tail decoy that can be affixed to a heavy, full-sized deer body decoy structure. The tail has two pivotal positions. The white portion of the deer tail decoy is visible continually, and does not attract a deer's attention. Moreover, the hunter must carry and maintain a full-sized deer body decoy structure. See also U.S. Pat. No. 5,546,692 which proposes a deer decoy resembling the hind quarters of a white tail deer. The decoy may be mounted into a ground surface with stakes. Tails are attached onto a rod for pivotal movement and are displayed at opposite sides of the decoy. Again, the hunter must carry and maintain a large deer body decoy structure to his hunting location. See also U.S. Pat. No. 7,814,700.

U.S. Pat. No. 7,441,365 shows a deer tail decoy mounted to a stake or pole. The flag simulating the deer tail hangs in downward direction with one side facing outwardly, and may be rotatably flipped by an actuator so that its opposite side faces outwardly. The structure is limited to attracting deer only located directly in front, and has no means to shield the opposite side of the flag from view. The structure requires a hunter to carry and secure a stake into the ground at or near his hunting location.

U.S. Pat. No. 6,510,644 shows a deer tail decoy of brown fabric and white fabric configured in a deer tail shape, preferably with multiple arcuate flaps. The deer tail decoy is linked to a hanging wire, and the wire is attached to a branch so that the decoy hangs downwardly. The deer tail decoy moves in response to wind motion. There is no mechanism for a hunter control movement. See also U.S. Pat. No. Des. 325,617 showing a pivoting deer tail decoy on a mounting structure. Such is designed to have the tail wave in the wind as it rotates, requiring a perfect breeze to simulate deer tail movement.

Notwithstanding various attempts to create deer decoys that are effective in attracting the attention of deer, the current decoys either fail to simulate the movement of a deer tail to a sufficient degree to attract and maintain the attention of deer, fail to permit a hunter to control their movement, and/or require burdensome mounting structure. Hunters continue to seek simple to operate, lightweight, and compact deer decoys that mimic the tail display motion of a doe in heat.

SUMMARY

A deer tail decoy has a first flap with an outer face and an inner face opposite said outer face, an upper edge and a generally pointed tip at a lower edge. The deer tail decoy has a second flap associated with the first flap, with the second flap having an outer face and an inner face opposite said outer face and defining an opening adapted to receive one or more fasteners to fasten the second flap to a mounting, such as a post or a tree trunk. A tell-tale flap is integral with or joined at least to the inner face of the first flap, and preferably is joined to the inner faces of both the first flap and the second flap. The tell-tale flap may have two or more flap edges that extend outwardly from the inner faces of the first flap and second flap.

An attachment is adapted to removably join the first flap and second flap to the mounting. The attachment may be a cording or roping threaded through a pocket formed at a top edge of the first flap. Fasteners may be provided at each of the first end and the second end of the cording or roping. In one embodiment, the fasteners may be hooks or clips. Preferably, the attachment is resilient or stretchable so that it may be stretched by application of a stretching force from a first length to a second length that is longer than the first length, and so that it recovers to its first length or substantially its first length when the stretching force is removed.

A pull cord is linked or removably joined at or near the generally pointed tip of the first flap. Optionally, a spool or string holder is provided to receive all or a portion of the pull cord. The spool or string holder may have a clip or rotatable link thereon to secure the pull cord onto the spool or string holder.

Optionally, the deer tail decoy has one or more weights disposed at or near the pointed tip of the first flap, and/or at or near the pointed lower tip of the second flap.

Preferably, the outer face of the first flap and the outer face of the second flap comprise a first material of a first color, and the inner face of the first flap and the inner face of the second flap comprise a second material of a color contrasting with the first color. In these embodiments, the first color may be a darker color, such as gray, black, brown, green, camouflage, or mixtures of these darker colors, and the second color may be white or substantially white. Preferably, the tell-tale flap is white or substantially white. The outer face of the first flap and the outer face of the second flap may be formed of a same material, and the inner face of the first flap and the inner face of the second flap may be formed of a same material.

Preferably, the first flap is pivotally associated with the second flap, such that raising the pointed tip of the first flap raises the first flap to expose at least a portion of the inner face of the first flap, at least a portion of the tell-tale flap and at least a portion of the inner face of the second flap. Upon raising the pointed tip of the first flap to a fully up position, all or substantially all of the inner face of the first flap, all or substantially all of the tell-tale flap and all or substantially all of the inner face of the second flap are exposed to view. The pointed tip of the first flap thus may be raised or lowered in response to pulling on the pull cord to simulate the motion of the tail of a white tail deer. In the closed configuration, the deer tail decoy has a triangular outer periphery shape, and in the fully open configuration, the deer tail decoy has a diamond-like outer periphery shape.

A more complete understanding of various configurations of the deer tail decoys disclosed herein will be afforded to those skilled in the art, as well as a realization of additional advantages and objects thereof, by consideration of the following detailed description. Reference will be made to the appended drawing sheets which will first be described briefly.

BRIEF DESCRIPTION OF THE DRAWINGS

The drawings described herein are for illustrative purposes only and are not intended to limit the scope of the present disclosure. In the drawings, wherein like reference numerals refer to similar components.

DETAILED DESCRIPTION

Figure 1:
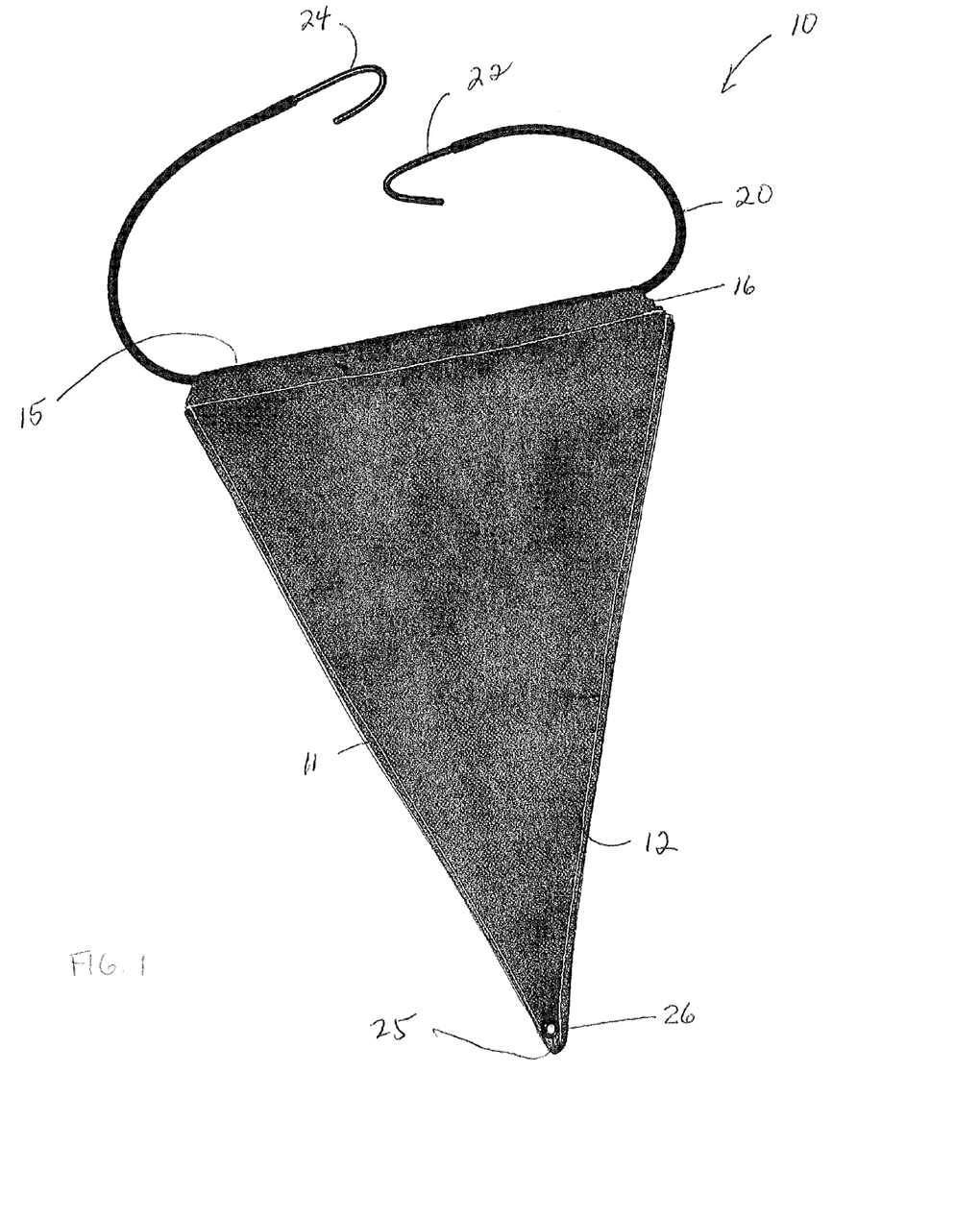
FIG. 1 is a top plan view of a deer tail decoy according to a first embodiment of the invention.
Figure 2:
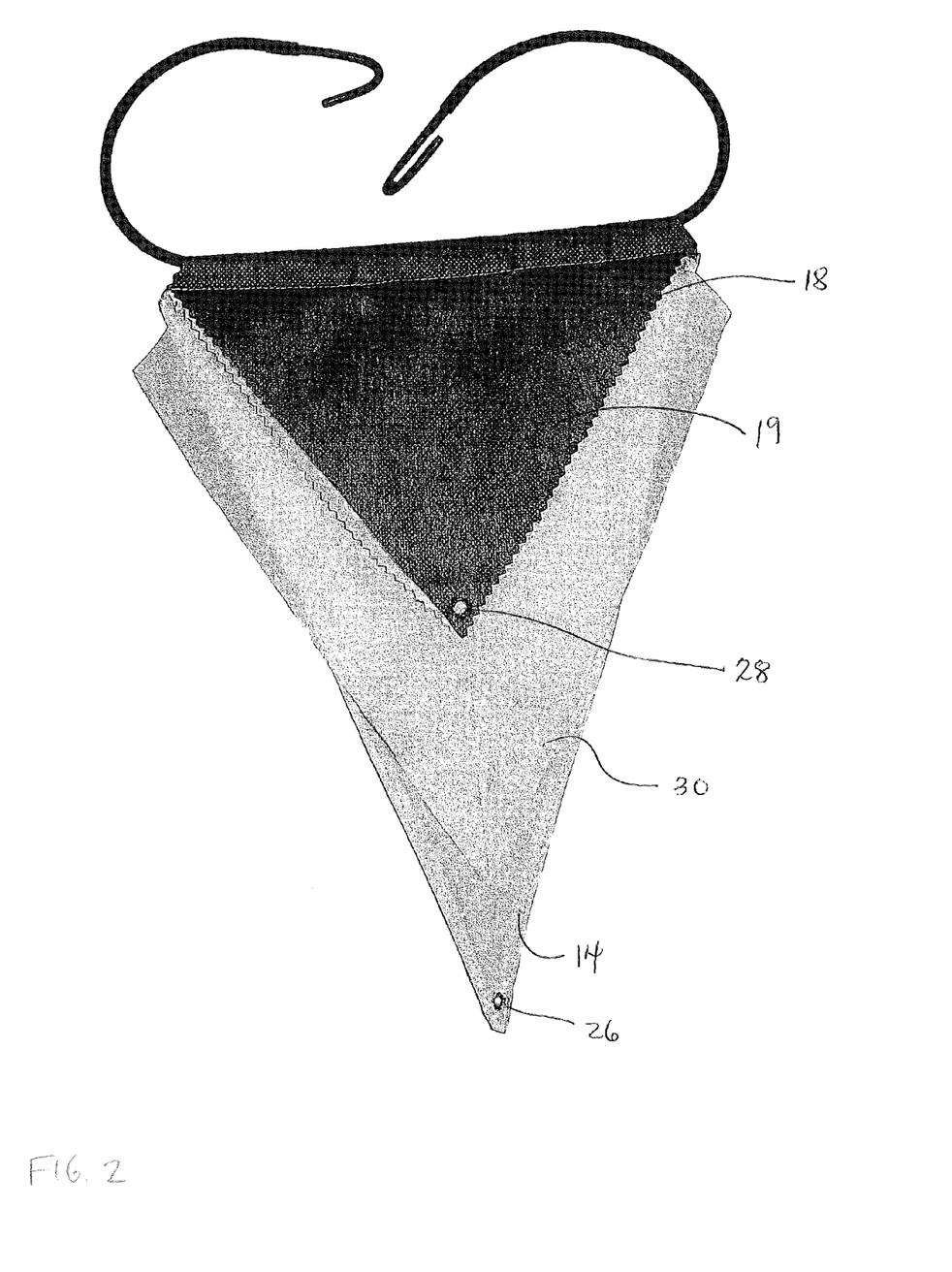
FIG. 2 is a rear plan view of the deer tail decoy of FIG. 1.

Referring first to FIGS. 1 and 2, a deer tail decoy 10 has a first or top flap 11 with a front or outer face 12 and a rear or inner face 14 opposite from the front or outer face. The front face 12 has a generally triangular outer periphery and defines a top edge 15 opposite a bottom tip or pointed tip 25. In one embodiment, the length of the first or top flap 11 from the top edge to the bottom tip is about 6 to about 18 inches. In such embodiment, the length of the top edge is from 6 to 10 inches.

The outer face 12 may be a textile fabric of suitable durability for outdoor use. Suitable fabrics include polyester-cotton blends, nylon, Rayon, and denim. If desired, the fabric may be stiffened by joining the fabric to a facing fabric or other stiffening substrate. To simulate the natural colors of the tails of white tail deer or of the anticipated mounting surface, the outer face 12 preferably is a dark color, such as but not limited to, gray, black, brown, green, camouflage, and/or mixtures thereof.

The rear or inner face 14 preferably is white or substantially white. The rear or inner face 14 may comprise a facing fabric or other stiffening substrate joined to the fabric forming the outer face 12.

A hole 26 is defined at or near the pointed tip 25 of the top or first flap 11. The hole 26 may be reinforced by a grommet as shown in FIGS. 1 and 2. The hole is adapted to receive a pull cord 36 (See FIGS. 3 and 4). The grommet may serve as a weight to cause the first flap 11 to orient with its pointed tip 26 facing downwardly. Optionally, one or more additional weights may be incorporated into the top or first flap 11 to cause the first flap 11 to orient with its pointed tip 26 facing downwardly. An exemplary weight separate from a grommet may be a zinc-coated steel or steel alloy piece that is sewed between the front or outer face and rear or inner face of the top flap. Such exemplary weight may have an annular or doughnut-shape and be located around hole 26 in the top flap 11.

At the top edge 15 of the first or top flap 11 a pocket 16 is formed. The pocket 16 is adapted to receive fastening means to join the deer tail decoy 10 to a mounting or mounting surface. In the embodiment shown in FIGS. 1 and 2, an attachment such as resilient cord 20 is threaded through the pocket 16. Hooks 22, 24 are provided at opposite ends of the resilient cord 20. Other fasteners, such as but not limited to, carabineer clips, hook and loop fasteners (e.g., VELCRO) or snaps, could be used instead of hooks 22, 24. In one embodiment, the resilient cord 20 comprises an elastic band covered with a nylon woving (e.g., Bungee cord). The resilient cord of such embodiment has a relaxed length of about 0.5-1.0 feet and a stretched length of about 0.8-3.0 feet.

Figure 4:
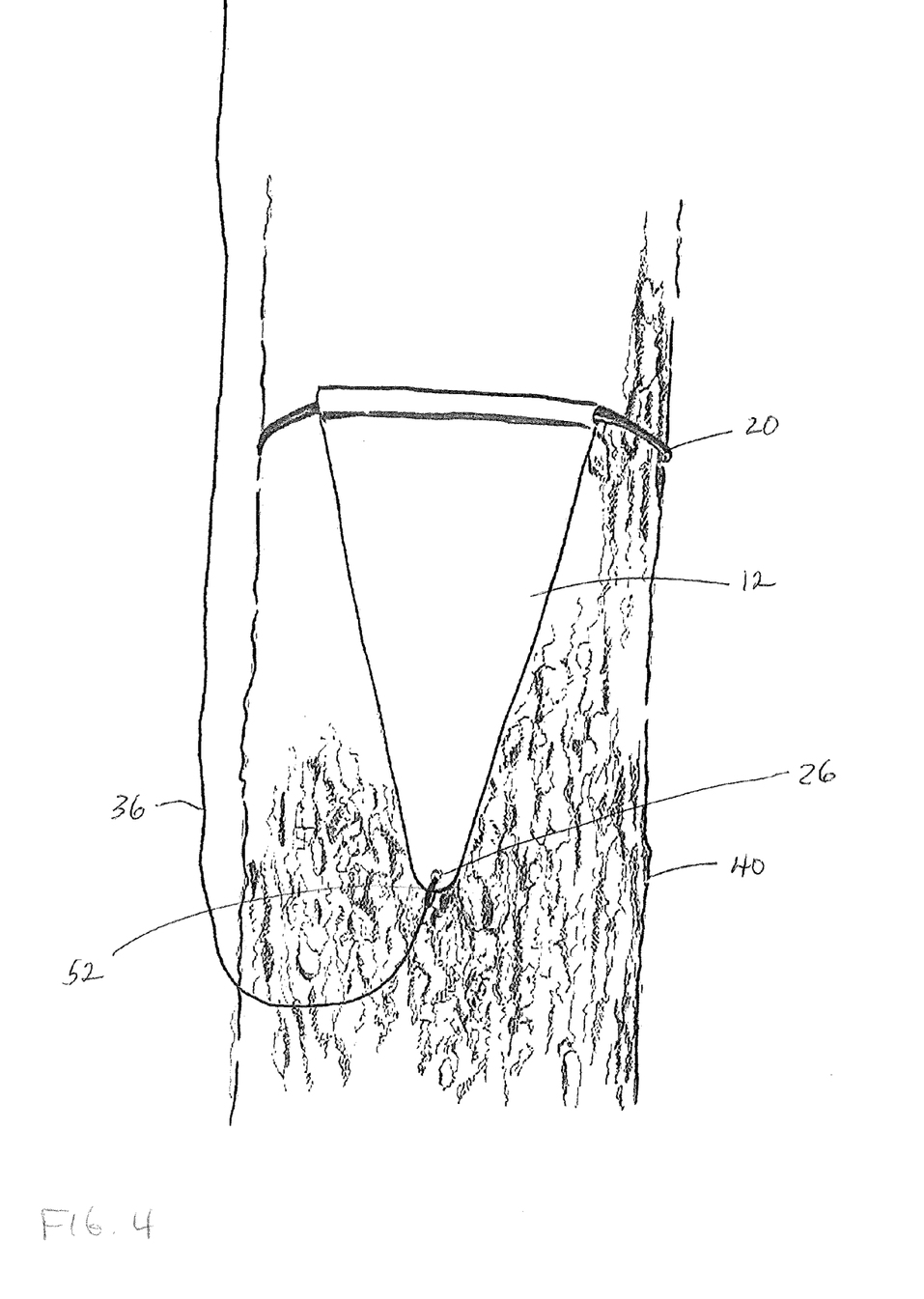
FIG. 4 is a front perspective view of the deer tail decoy of FIG. 1 mounted to a tree trunk mounting surface.

A second or bottom flap 18 is associated with or joined to the first or top flap 11. The first or top flap 11 may be folded over the second or bottom flap 18. The second or bottom flap 18 has an outer surface 19 and an inner surface 17. In one embodiment, the outer surface 19 of the second flap 18 and the outer surface 12 of the first flap 11 are formed of a same material, and the inner surface 17 of the second flap 18 and the inner surface 14 of the first flap 11 are formed of a same material. In the embodiment shown, the outer surfaces 12, 19 are formed of a dark fabric and the inner surfaces 14, 17 are formed of a white fabric. In the closed configuration, such as shown in FIGS. 1 and 4, the first or top flap 11 covers the second or bottom flap 18 screening the second or bottom flap 18 from view.

The pocket 16 is at the top edge of the second or bottom flap 18 in this embodiment. A hole 28 is defined at or near the pointed tip that is opposite the top edge and pocket 16. The hole 28 may be reinforced by a grommet, as shown in FIG. 2. The grommet may serve as a weight to cause the second or bottom flap 18 to orient with its pointed tip facing downwardly. Optionally, one or more additional weights may be incorporated into the second or bottom flap 18 to cause the bottom flap 18 to orient with its pointed tip facing downwardly. An exemplary weight separate from a grommet may be a zinc-coated steel or steel alloy piece that is sewed between the front or outer face and rear or inner face of the bottom flap. Such exemplary weight may have an annular or doughnut-shape and be located around hole 28 in the bottom flap 18. The hole 28 is adapted to receive a pin or clip or other fastener 44 to join the second or bottom flap 18 to a mounting surface. (See FIG. 5).

A tell-tale flap 30 is joined to or integrally formed with at least the inner face 14 of the first or top flap 11. In the embodiment shown in FIGS. 2 and 3, the tell-tale flap 30 comprises a sheet or panel of fabric joined at its central portion to the inner faces 14, 17 of the top flap 11 and bottom flap 18. The tell-tale 30 in this embodiment has two flapping panes or sheets with edges that are not joined or connected to the top flap or bottom flap. The outer edges of the flapping panes or sheets of the tell-tale 30 may flutter in response to movement of the top flap 11 or in response to wind gusts.

The tell-tale flap 30 may be formed of a lightweight fabric or film, such as cotton, nylon, polyester, and/or blends of these. To simulate the natural colors of a white tail deer, the tell-tale flap 30 preferably is a white or substantially white material.

Figure 5:
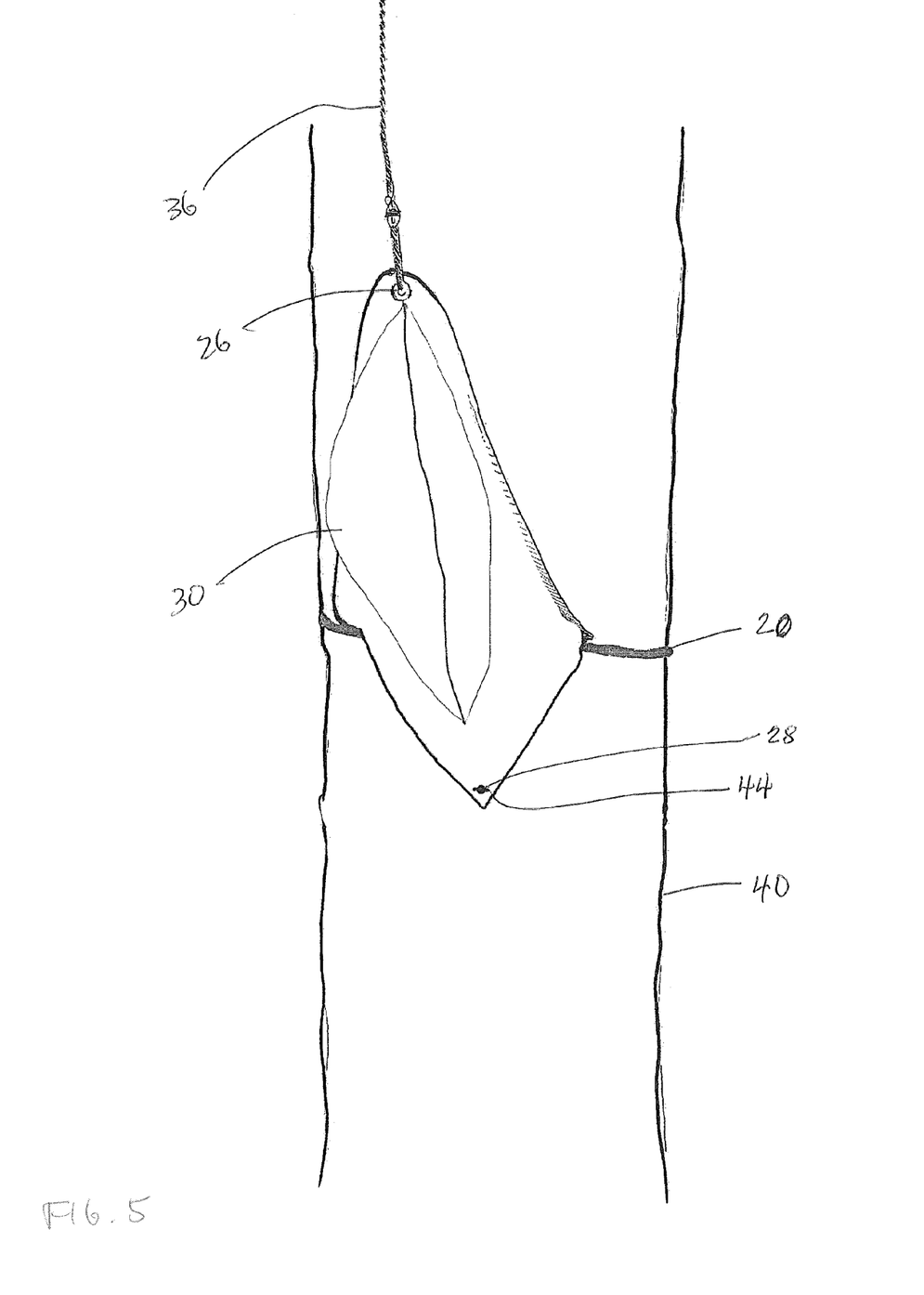
FIG. 5 is a right perspective view of the deer tail decoy of FIG. 1 shown in an open configuration.

A pull cord 36 may be joined to the hole 26 at the pointed tip of the top or first flap 11. As shown in FIGS. 4 and 5, the pull cord 36 may have a clip or clasp 52 at one end to facilitate fastening the pull cord 36 to the first flap 11. In one embodiment, the pull cord 36 comprises a nylon string, cording or rope with a length of at least about 20 to 25 feet. One example of a suitable string is braided cord with a diameter of 0.9 mm.

Referring now to FIGS. 4 and 5, the deer tail decoy 10 is mounted to a mounting 40 such as a tree trunk as shown, or a post or other structure. The resilient cord 20 is wrapped around the mounting 40 and the hooks 22, 24 at the end of the resilient cord are joined to one another to hold the deer tail decoy 10 in place against the mounting 40. Optionally, the bottom or second flap 18 may be joined to the mounting 40 by pin or stake or clip or other fastener 44 that extends through hole 28. Securing the bottom or second flap 18 better secures the deer tail decoy from unintended movement in response to wind gusts, and better keeps the deer tail decoy in alignment when the hunter controls movement of the first or top flap 11.

Figure 3:
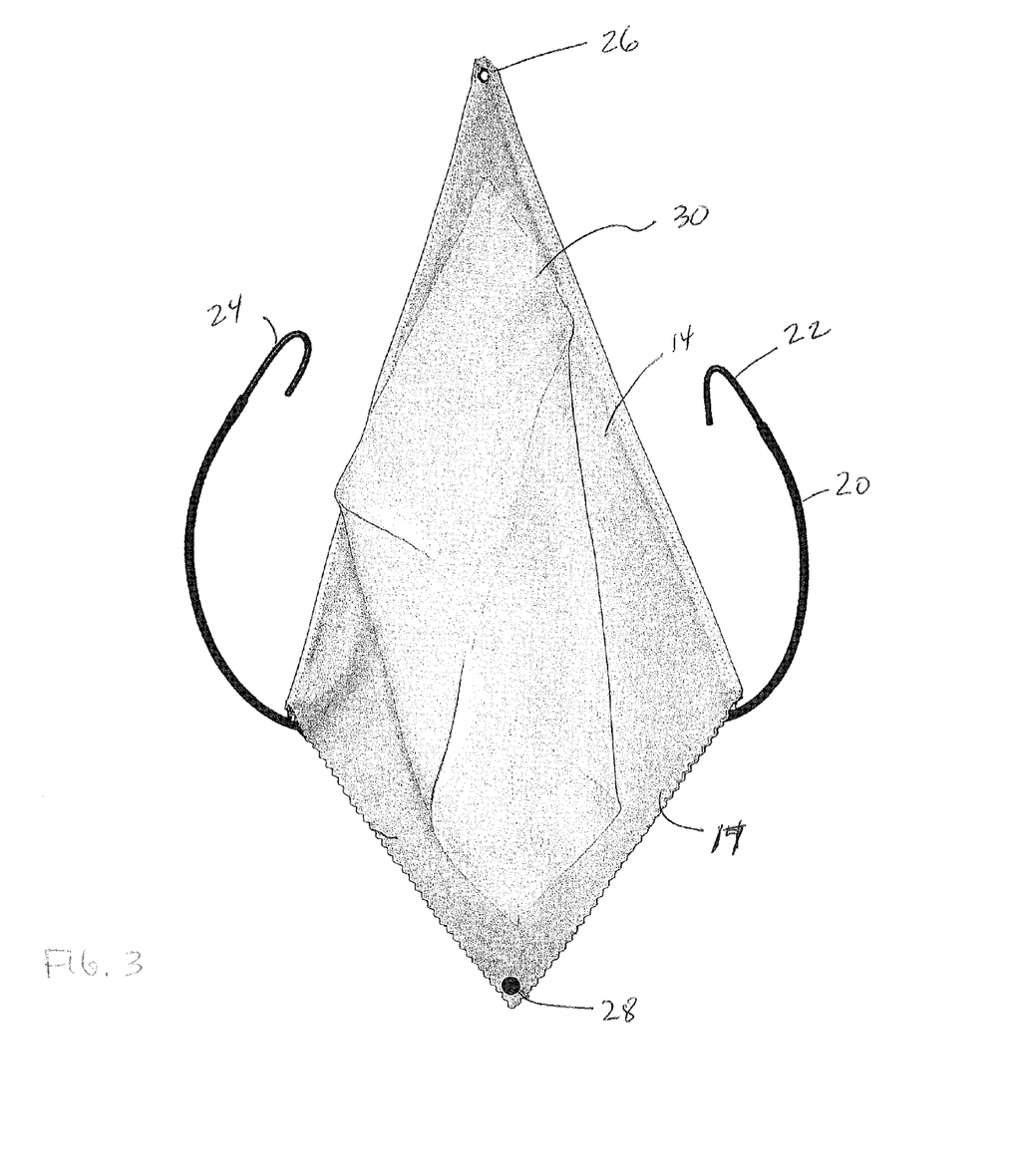
FIG. 3 is a front elevation view of the deer tail decoy of FIG. 1 shown in an open configuration.

Comparing FIG. 4 with FIGS. 3 and 5, the deer tail decoy 10 in FIG. 4 is shown in down position. As such, the outer face 12 of the top or first flap 11 faces outwardly and the top or first flap 11 covers the bottom or second flap 18. The optional weight within the top or first flap 11 helps to maintain the top or first flap 11 in the down position. Preferably, the outer face 12 of the top or first flap 11 is a dark color to simulate the colors of the coat of a white tail deer or a color suitable to match the mounting.

When the hunter seeks to draw an animal closer to the hunter's location, the hunter tugs on the pull cord 36 to cause the top or first flap 11 to pivot upwardly to an open position or configuration as shown in FIGS. 3 and 5. In the open position or configuration, the deer tail decoy 10 has an outer periphery that is substantially diamond shaped. The inner surfaces 14, 17 of the top or first flap 11 and bottom or second flap 18 are exposed to view. Additionally, the tell-tale flap 30 is exposed to view. The hunter may tug and release the pull cord 36 to generate fluttering motion in the tell-tale 30 panes or panels and in the top or first flap 11. Alternatively or in addition, wind gusts may generate fluttering motion in the tell-tale panes or panels.

In the open configuration, the inner surfaces 14, 17 flash a light color or white color to simulate a tail of a doe. The tell-tale flap 30 has panes that can be seen from directions offset from straight on view. The movement of the deer tail decoy 10 may be controlled by pulling and releasing the pull cord to effect motion in the first or top flap 11 and the tell-tale flap 30.

Figure 6:
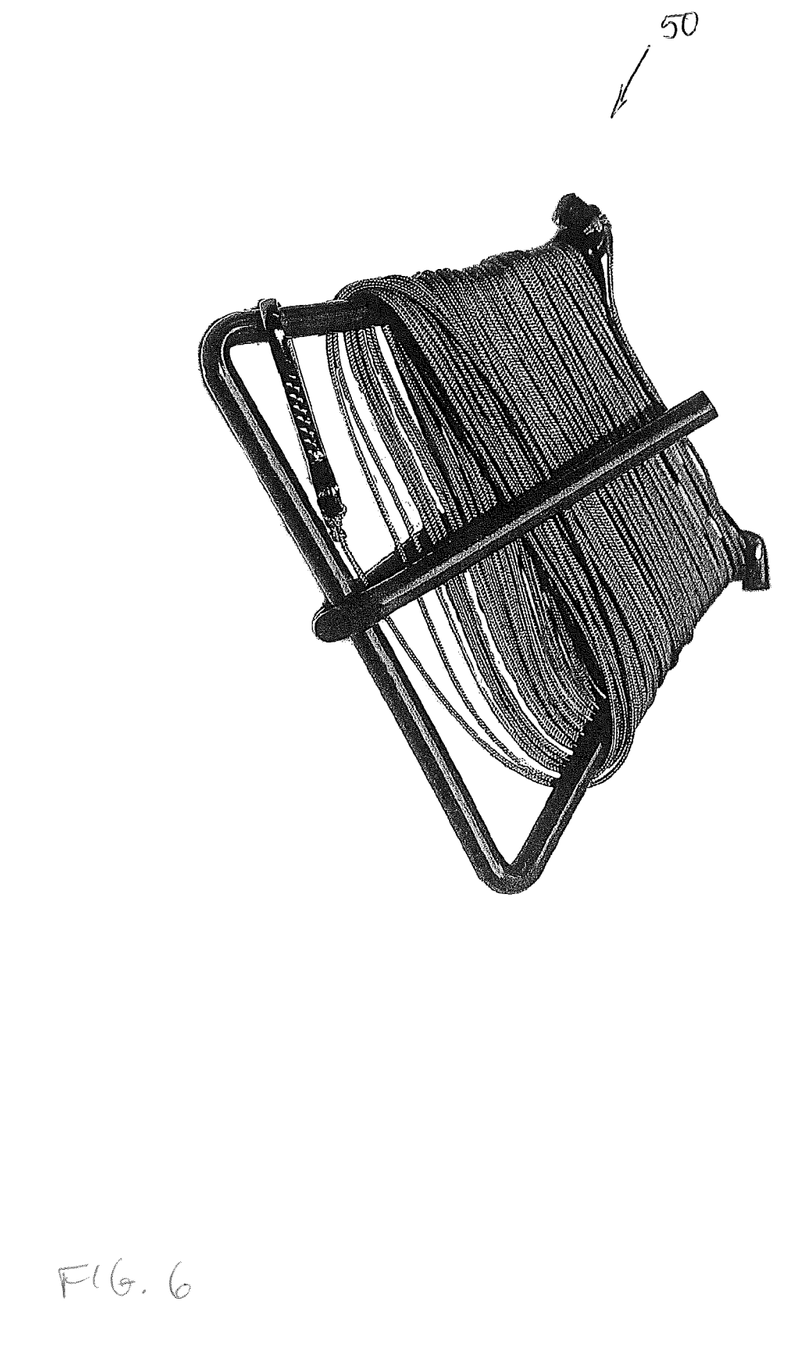
FIG. 6 is a right perspective view of a spool or string holder adapted for use with the deer tail decoy, with the pull cord or string wound thereon.
Figure 7:
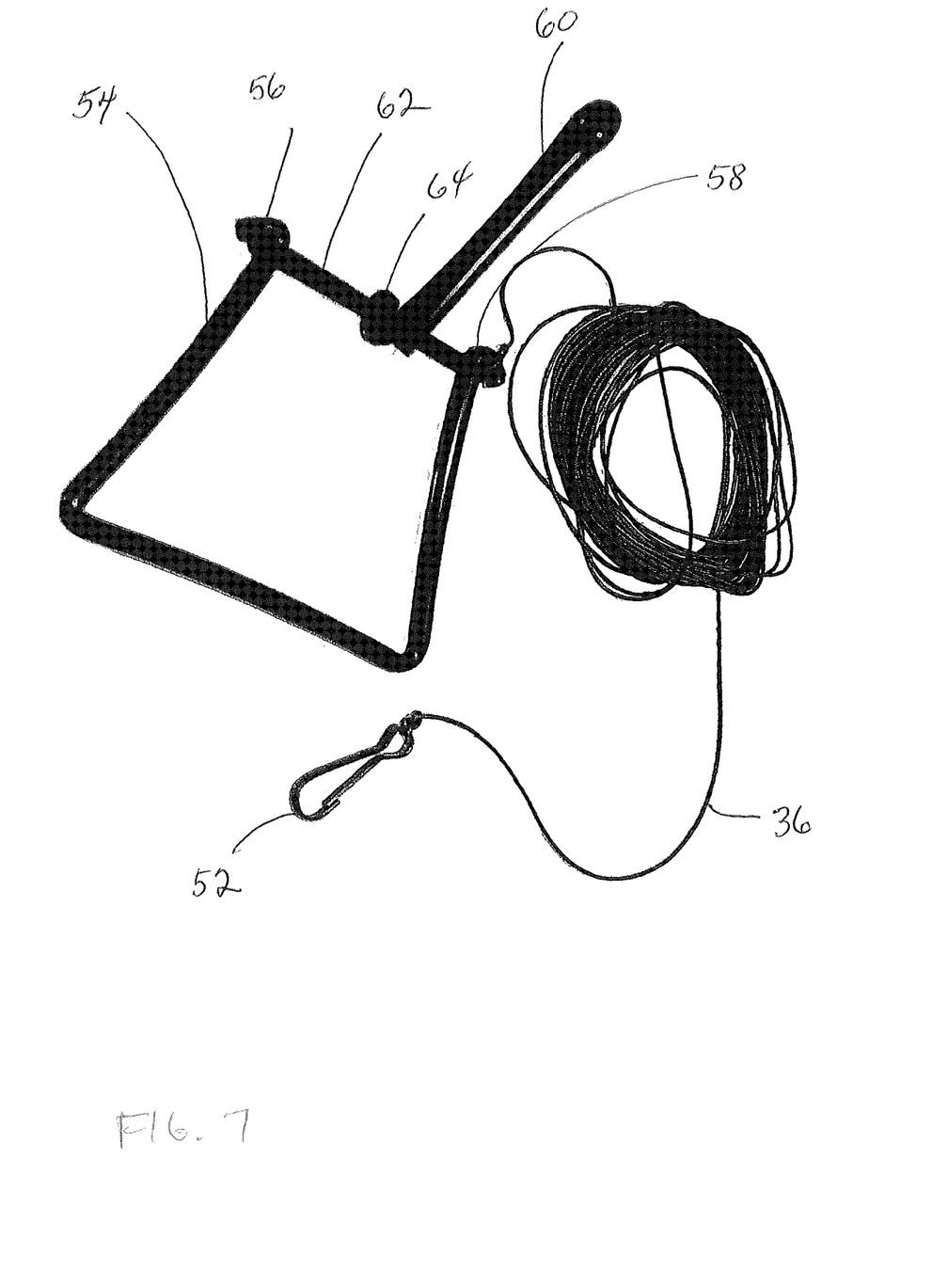
FIG. 7 is a right perspective view of the spool or string holder of FIG. 6, with the pull cord or string unwound.

Optionally, a spool or string holder 50 may be provided to secure the pull cord 36 for storage. Referring to FIGS. 6 and 7, one spool or string holder 50 has a frame or spool body 54 that terminates at upper corners 56, 58. A linking bar 62 extends between the corners 56, 58. A lock arm 60 is rotatably joined to the linking bar 62 by hinge connection 64. One end of the pull cord 36 may be joined to a corner 58 of the spool or string holder 50. The opposite end of the pull cord 36 terminates at a clip or clasp or other fastener 52 for joining the pull cord 36 to the deer tail decoy. The length of the pull cord 36 may be coiled about the spool body 54. Once the pull cord 36 is so coiled, the lock arm 60 may be rotated from its open position (see FIG. 7) to its closed position (see FIG. 6) to maintain the pull cord 36 on the frame or spool body 54 for storage.

The deer tail decoy 10 may be installed to various upright mountings that will be present at or near a hunter's location, including but not limited to, tree trunks and deer stand uprights. The deer tail decoy 10 comprises lightweight and flexible materials that may be rolled or folded for storage and transport. Ideally, the deer tail decoy 10, with pull cord 36 and resilient cord attachment 20, can fit within a pocket of a hunter's vest or jacket. The flaps 11, 18, 30 preferably are formed of wash-durable materials.

Thus, various configurations of deer tail decoys and spools or string holders for use with such decoys are disclosed. While embodiments of this invention have been shown and described, it will be apparent to those skilled in the art that many more modifications are possible without departing from the inventive concepts herein. Moreover, the examples described herein are not to be construed as limiting. The invention, therefore, is not to be restricted except in the spirit of the following claims.

What is claimed is:

1. A deer tail decoy, comprising:
   a first flap with an outer face and an inner face opposite said outer face, said first flap having an upper edge and a generally pointed tip at a lower edge;
   a second flap associated with the first flap, said second flap having an outer face and an inner face opposite said outer face and defining an opening adapted to receive one or more fasteners to fasten the second flap to a mounting, wherein the outer face of the first flap and the outer face of the second flap comprise a first material of a first color, and the inner face of the first flap and the inner face of the second flap comprise a second material of a second color contrasting with the first color;
   a tell-tale flap integral with or joined at least to the inner face of the first flap;
   an attachment adapted to removably join the first flap and second flap to the mounting; and
   a pull cord linked or removably joined at or near the generally pointed tip of the first flap.

2. The deer tail decoy of claim 1, further comprising one or more weights disposed at or near the pointed tip of the first flap.

3. The deer tail decoy of claim 1, wherein the second flap has an upper edge and a tip at a lower edge, and the opening defined in the second flap is at or near the tip.

4. The deer tail decoy of claim 3, further comprising one or more weights disposed at or near the tip of the second flap.

5. The deer tail decoy of claim 1, wherein the first color is a color selected from the group consisting of: gray, black, brown, green, camouflage, and mixtures thereof, and the second color is white or substantially white.

6. The deer tail decoy of claim 1, wherein the tell-tale flap is white or substantially white.

7. The deer tail decoy of claim 1, wherein the outer face of the first flap and the outer face of the second flap are formed of a same material.

8. The deer tail decoy of claim 1, wherein the inner face of the first flap and the inner face of the second flap are formed of a same material.

9. The deer tail decoy of claim 1, wherein the tell-tale flap is integral with or joined to the inner face of the second flap.

10. The deer tail decoy of claim 9, wherein the tell-tale flap comprises two or more flap edges that extend outwardly from the inner faces of the first flap and second flap.

11. The deer tail decoy of claim 1, wherein a pocket is formed at the upper edge of the first flap.

12. The deer tail decoy of claim 11, wherein the attachment comprises a cording or roping threaded through the pocket formed at the upper edge of the first flap.

13. The deer tail decoy of claim 12, wherein the cording or roping defines a first end and a second end, and fasteners are provided at each of the first end and the second end.

14. The deer tail decoy of claim 12, wherein the cording or roping is resilient or stretchable so that it may be stretched by application of a stretching force from a first length to a second length that is longer than the first length, and so that it recovers to its first length or substantially its first length when the stretching force is removed.

15. The deer tail decoy of claim 1, further comprising a spool or string holder to receive all or a portion of the pull cord.

16. The deer tail decoy of claim 15, further comprising a clip or rotatable link associated with the spool or string holder to secure the pull cord onto the spool or string holder.

17. The deer tail decoy of claim 1, further comprising a fastener adapted to secure the second flap to the mounting.

18. The deer tail decoy of claim 1, wherein the outer face of the first flap has a triangular shape.

19. The deer tail decoy of claim 1, wherein the first flap is pivotally associated with the second flap, such that raising the pointed tip raises the first flap to expose at least a portion of the inner face of the first flap, at least a portion of the tell-tale flap and at least a portion of the inner face of the second flap.

20. The deer tail decoy of claim 19, wherein the pointed tip of the first flap is raised or lowered in response to pulling on the pull cord.

21. The deer tail decoy of claim 19, wherein upon raising the pointed tip of the first flap to a fully up position exposes all or substantially all of the inner face of the first flap, all or substantially all of the tell-tale flap and all or substantially all of the inner face of the second flap, and the decoy has a periphery of a diamond-like shape.

\* \* \* \* \*